(12) United States Patent
Chen et al.

(10) Patent No.: US 11,606,446 B1
(45) Date of Patent: Mar. 14, 2023

(54) MICROAPPLICATION COMPOSITION

(71) Applicant: International Business Machines Corporation, Armonk, NY (US)

(72) Inventors: Yu-Siang Chen, Taipei (TW); Ching-Chun Liu, Taipei (TW); Joey H. Y. Tseng, Taipei (TW); Amanda P L Yang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/472,726

(22) Filed: Sep. 13, 2021

(51) Int. Cl.
H04L 67/60 (2022.01)
G06F 11/34 (2006.01)
H04L 67/51 (2022.01)

(52) U.S. Cl.
CPC ......... H04L 67/60 (2022.05); G06F 11/3409 (2013.01); H04L 67/51 (2022.05)

(58) Field of Classification Search
CPC ....... H04L 67/60; H04L 67/51; G06F 11/3409
See application file for complete search history.

(56) References Cited

U.S. PATENT DOCUMENTS

| | | | |
|---|---|---|---|
| 7,421,716 B1 | 9/2008 | Margulis et al. | |
| 8,261,231 B1 | 9/2012 | Hirsch | |
| 10,951,509 B1 * | 3/2021 | Liu | H04L 43/04 |
| 2009/0007067 A1 | 1/2009 | Hepper | |
| 2012/0075178 A1 | 3/2012 | Cho et al. | |
| 2012/0089931 A1 * | 4/2012 | Steinhauer | G06F 9/451 |
| | | | 715/764 |
| 2013/0124529 A1 * | 5/2013 | Jacob | G06F 9/44505 |
| | | | 707/E17.089 |
| 2013/0226736 A1 * | 8/2013 | Hogg | G06Q 30/0625 |
| | | | 705/26.61 |
| 2015/0121071 A1 * | 4/2015 | Schwarz | H04L 63/08 |
| | | | 713/168 |
| 2015/0169285 A1 | 6/2015 | Reyes | |
| 2016/0381118 A1 * | 12/2016 | Andrews | H04W 4/18 |
| | | | 709/218 |
| 2017/0201521 A1 * | 7/2017 | Bruno | H04L 63/107 |
| 2019/0121669 A1 | 4/2019 | Almasan | |
| 2019/0339833 A1 | 11/2019 | Moore | |

(Continued)

FOREIGN PATENT DOCUMENTS

| | | |
|---|---|---|
| CN | 113159972 A | 7/2021 |
| WO | 2013180505 A1 | 12/2013 |
| WO | 2016011084 A1 | 1/2016 |

OTHER PUBLICATIONS

"The App market is saturated? US market survey shows: 51% of users have not downloaded and 66% have not bought paid apps within a month", Downloaded May 2, 2021, 1 page, <https://group.dailyview.tw/article/detail/465>.

(Continued)

*Primary Examiner* — Michael A Keller
*Assistant Examiner* — Thao D Duong
(74) *Attorney, Agent, or Firm* — Brian M. Restauro

(57) ABSTRACT

Embodiments of the present invention provide computer-implemented methods, computer program products and computer systems. Embodiments of the present invention can, in response to receiving a request, dynamically generate a composite application that includes one or more micro applications based, at least in part, on a user's intention.

11 Claims, 6 Drawing Sheets

(56) References Cited

U.S. PATENT DOCUMENTS

| | | | |
|---|---|---|---|
| 2020/0042295 A1* | 2/2020 | Straub | G06N 3/0445 |
| 2020/0348841 A1* | 11/2020 | Kuhn | G06F 3/0652 |
| 2021/0182117 A1* | 6/2021 | Chen | G06F 11/3409 |
| 2021/0209077 A1* | 7/2021 | Snellman | G06F 16/219 |
| 2022/0191160 A1* | 6/2022 | U | H04L 51/42 |

OTHER PUBLICATIONS

Costello, Sam, "How Many Apps Are in the App Store?", Updated on Feb. 24, 2020, 7 pages, <https://www.lifewire.com/how-many-apps-in-app-store-2000252>.

Paliokas et al., "OneAppy: An Interactive Platform Providing Novel Marketing Channels and Promoting Product and Services to the Tourism Industry", Conference Paper—Oct. 2018, 9 pages.

Sharma, Avinash, "Top Google Play Store Statistics 2019-2020 You Must Know", Jul. 22, 2019, Last update on: Sep. 7, 2020, 11 pages, <https://appinventiv.com/blog/google-play-store-statistics/>.

Jiang Bo, "Micro Front-end Technology Split Method," Oct. 2020 (Machine Translation) https://wiberjiang.com/post/framework/%E5%BE%AE%E5%89%8D%E7%AB%AF%E7%9A%84%E6%8A%80%E6%9C%AF%E6%8B%86%E5%88%86%E6%96%B9%E5%BC%8F/.

International Search Report and Written Opinion for Application No. PCT/CN2022/117549, dated Nov. 30, 2022, 10 pages.

\* cited by examiner

MICROAPPLICATION COMPOSITION

BACKGROUND

The present invention relates in general to mobile applications and in particular to intelligent micro-application composition.

A micro-application (e.g., a microapp) typically refers to an interactive software module designed to perform like a fully coded application or website. Microapps are normally accessible on any device, display, or operating system without installation to the viewer's device. Microapps typically have the following characteristics: be built and deployed without customized code, bring together various media types into a single experience, function offline, have advanced security and compliance features, be functionally-extensible, and comply with granular data demands.

Microapps are differentiated from traditional mobile applications by how they are delivered to the end user. Consequently, they can be embedded in websites or viewed online to bypass app stores and are typically built to provide a focused experience to the use.

SUMMARY

According to an aspect of the present invention, there is provided a computer-implemented method. The computer implemented method comprises: in response to receiving a request, dynamically generating a composite application that includes one or more micro applications based, at least in part, on a user's intention.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize certain limitations of existing applications. Typically, each application is designed to perform a singular function (e.g., a graphics editor). A user thus generally installs a respective application for each task a user wants to accomplish (e.g., social media apps, graphics editors, audio editors, etc.). In other words, users typically have to access multiple applications to achieve a specific task. For example, a user's task can be making a card that includes photographs and text accompanying the photographs. Using traditional solutions, the user might need to access multiple applications (e.g., an application to take a photograph, a graphics editor, and a card making application). As such, a user might have to otherwise install and learn multiple different applications to achieve a singular task (e.g., make a card).

Embodiments of the present invention also recognize that each application requires installation requirements that need to be satisfied before it can be installed (e.g., CPU usage, memory, etc.). In some cases, users may have to prioritize applications because of limited memory. In doing so, a user may not be able to accomplish the task due to the installation requirements of applications the user needs to accomplish the task. Accordingly, embodiments of the provide solutions for devices having fixed memory provide solutions accomplishing tasks without having to install multiple applications. Thus, embodiments of the present invention improve a computing device by freeing up or otherwise not requiring additional memory (of the user device) to perform user tasks. Specifically, embodiments of the present invention can dynamically create and deliver a custom composite application based, at least in part, on a user's task as discussed in greater detail, later in this Specification.

Figure 1:
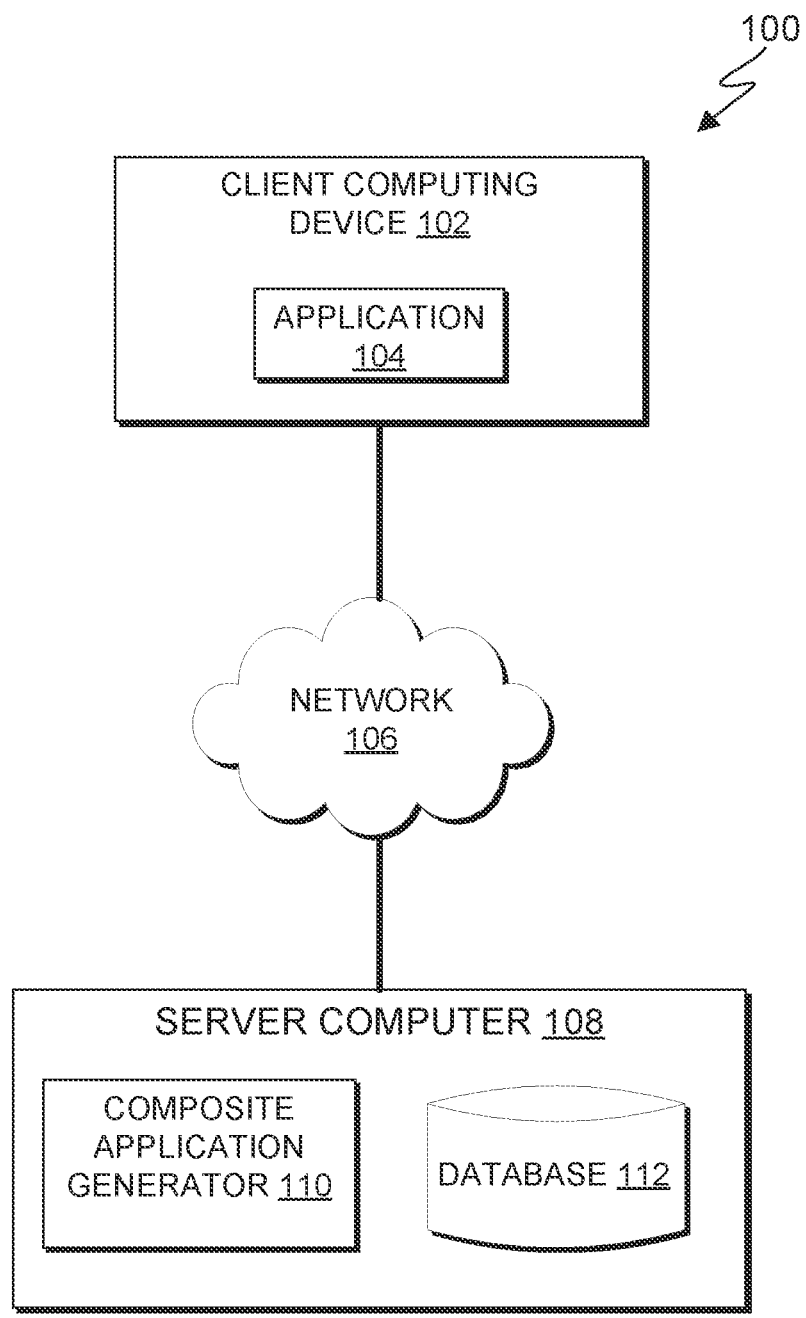
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access composite application generator 110 (e.g., using TCP/IP) to access content, user information, and database information (e.g., flow databases and micro application databases). Application 104 can further communicate with composite application generator 110 to dynamically create and deliver a custom composite app based on a user's task, as discussed in greater detail in FIG. 2.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts composite application generator 110 and database 112. In this embodiment, composite application generator 110 resides on server computer 108. In other embodiments, composite application generator 110 can have an instance of the program (not shown) stored locally on client computer device 102. In other embodiments, composite application generator 110 can be a standalone program or system that can, dynamically create and deliver a custom composite application based on the user's intention. In yet other embodiments, composite application generator 110 can be stored on any number or computing devices.

Composite application generator 110 creates a custom composite app based, at least in part, on the user's task. In this embodiment, composite application generator 110 includes a registration module (not shown), request module (not shown), learning module (not shown), a recommendation module (not shown), and a request module (also not shown). Composite application generator 110 can leverage each of these modules to learn operations performed by the user, group those operations, identify micro applications that perform the same or similar functions, and construct a composite application comprising the identified micro application according to the flow of operations performed by the user as discussed in greater detail with respect to FIGS. 2-5.

In response to receiving a request (via the request module), composite application generator 110 can register a user (e.g., using the registration module). In this embodiment, composite application generator 110 can record group information (e.g., of applications currently installed on a user device) as well as user profile information (e.g., to group similar users having similar groups of applications and indicate a willingness to share generated composite applications).

A request can include a respective task and other user specified requirements. In some cases, a request can describe a flow of operations (sometimes referred to as a "flow"), that is, a sequence of operations that need to be performed to achieve or otherwise satisfy the respective task. For example, a flow can include a specified task (e.g., make a card), and a respective order of subtasks or functions that need to be performed to achieve the specified task (e.g., take photograph, edit image captured, add text to edited image). In some embodiments, the request can also specify a category of an application needed (e.g., graphic editor). In certain other embodiments, composite application generator 110 can categorize a received request into respective categories of application that are required and identify a potential flow for the applications needed. Composite application generator 110 can then save the received request along with associated description of flow operations needed to satisfy the user request.

Composite application generator 110 can learn member behaviors, that is, learn user intention (e.g., using the learning module) using a combination of machine learning, natural language processing, and artificial intelligence algorithms. For example, composite application generator 110 can learn the context, that is, can learn scenarios and flow that is used to satisfy one or more tasks. A task, as used herein, refers to one or more operations performed either by the user or instructed by the user. A task can be singular in nature (e.g., a word processing task) or can be combined as a series of subtasks in the performance of a request (e.g., a graphics overlay, photo editing, word processing, etc.). In this embodiment, composite application generator 110 can learn member behaviors by detecting an operation being performed by the user, categorizing that operation into a category, analyzing operation into respective functions performed by one or more microapps, and recording the flow and respective metadata into respective databases, as discussed in greater detail with respect to FIGS. 2-4.

In embodiments where composite application generator 110 is configured in a learning mode, composite application generator 110 can detect all operations performed by the user within a specified time period. For example, composite application generator 110 can detect and analyze operations performed within a five-minute period after the last operation is performed. In other embodiments, composite application generator 110 can be configured to record all operations performed within a specified time period regardless of the last operation being performed. In yet another embodiment, composite application generator 110 can be configured in a manual mode to allow a user to specify when composite application generator should begin and end recording a flow of operations.

In response to receiving a future request, composite application generator 110 may access a database of previously stored requests and stored operation flows to identify matching microapps that satisfy the received request. In instances where composite application generator 110 cannot identify a previously stored request, composite application generator 110 can identify function models for the custom composite application from a trusted group of micro applications or from other public sources. Composite application generator 110 can leverage an access control module (not shown) to access recommended microapps and associated flows to access a member database to be shared amongst participating members. In instances where composite application generator 110 cannot identify a microapp that can be shared, composite application generator 110 can outsource or otherwise identify other microapps with similar functions from other publicly available databases.

Composite application generator 110 can then leverage the access control module to generate a recommended flow (e.g., using the recommendation module) of respective microapps to satisfy the received request. In this embodiment, composite application generator 110 can access the request and generate a recommended flow-based requirements of the request and collected user behavior. In certain other embodiments, composite application generator 110 can access the request and recommended flow (e.g., where the user has specified a flow of operations or flow of tasks needing to be performed).

Regardless of how the flow is generated, composite application generator 110 determines whether the flow can be satisfied with microapps that composite application generator 110 has access to. In this embodiment, composite application generator 110 determines that a flow can be satisfied by identifying microapps it has access to that can satisfy the received request. Composite application generator 110 determines that a microapp can satisfy the received request by identifying functional capabilities of the microapp from metadata associated with the microapp and comparing the identified functional capability to user requirements specified in the received request. In this manner, composite application generator 110 can identify a microapp as capable of satisfying the received request in response to determining that the functional capabilities match or otherwise perform functions of the received request.

In response to determining that the flow can be satisfied, composite application generator 110 can then group (i.e., package) the identified microapps as a single solution and subsequently deploy the solution. In response to determining that the flow cannot be satisfied, composite application generator 110 can outsource, that is, locate other free microapps with similar functions that satisfy the received request. Composite application generator 110 can then store the configuration of microapps and make the solution available for other participating members. In certain embodiments, composite application generator 110 can solicit user feedback and optionally modify the generated solution.

In certain embodiments, composite application generator 110 can be integrated in a framework that enables application developers to create and publish application features or functions as independent modules that can be used to create (i.e., compose) a composite application to achieve an end-to-end solution.

Database 112 stores received information and can be representative of one or more databases that give permissioned access to composite application generator 110 or publicly available databases. For example, database 112 can store member registrations, respectively associated user information, recorded flows and publicly available micro applications. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
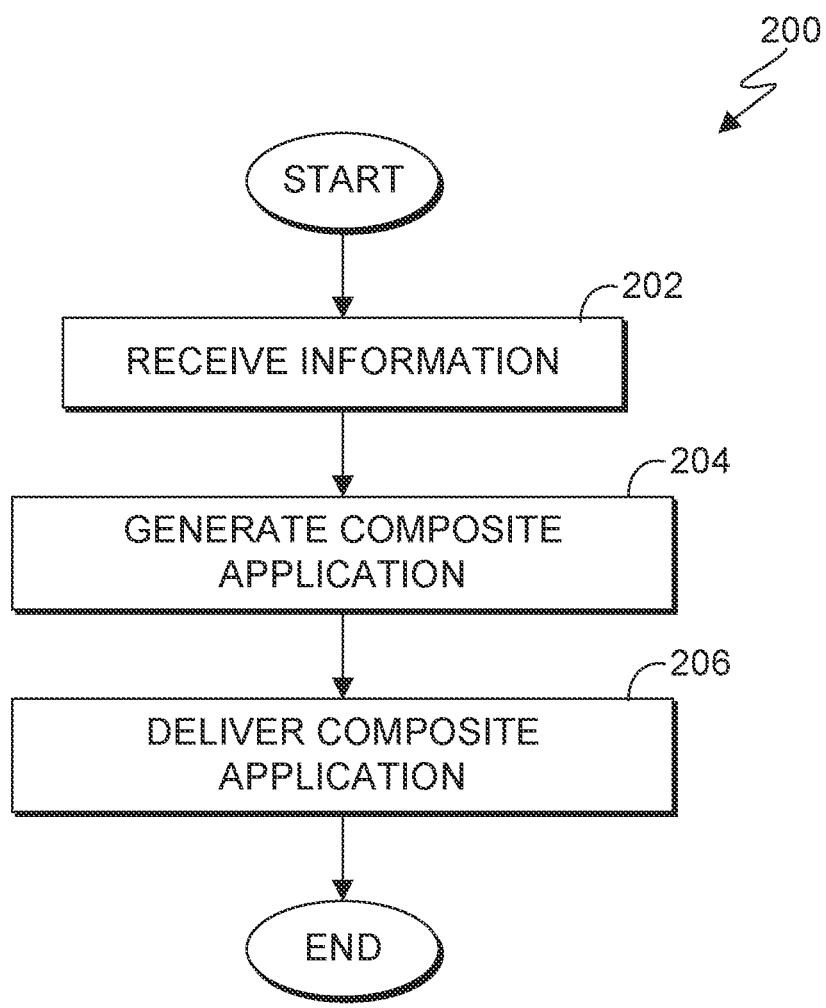
FIG. 2 is a flowchart depicting operational steps for generating and delivering a composite application, in accordance with an embodiment of the present invention.

FIG. 2 is a flowchart 200 depicting operational steps for generating and delivering a composite application, in accordance with an embodiment of the present invention.

In step 202, composite application generator 110 receives information. In this embodiment, the received information can include a request from client computing device 102 to register as a member. In other embodiments, the information received may be a request to compile a composite application. As mentioned above, the request can include a respective task and other user specified requirements. In some cases, a request can describe a flow of operations (sometimes referred to as a "flow"), that is, a sequence of operations that need to be performed to achieve or otherwise satisfy the respective task. For example, a flow can include a specified task (e.g., make a card), and a respective order of subtasks or functions that need to be performed to achieve the specified task (e.g., take photograph, edit image captured, add text to edited image). In some embodiments, the request can also specify a category of an application needed (e.g., graphic editor). In other embodiments, composite application generator 110 can receive information from one or more other components of computing environment 100.

In step 204, composite application generator 110 generates a composite application. In this embodiment, composite application generator 110 generates a composite application based, at least in part on, the received user request. In instances where composite application generator 110 has access to multiple stored flows and microapps, composite application generator 110 can categorize the received request and identify stored flows and respectively associated configurations of microapps that match functions of the received request.

Figure 3:
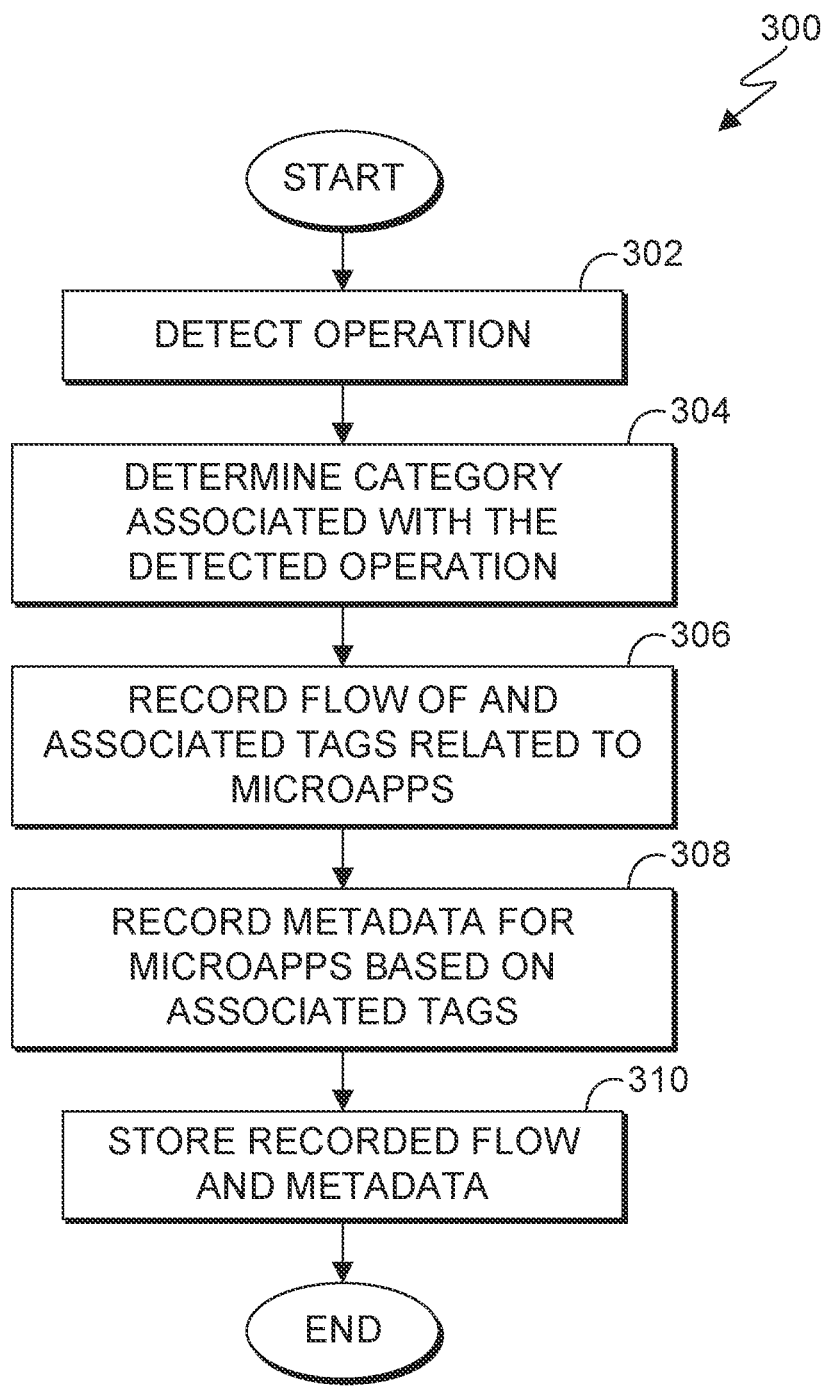
FIG. 3 is a flowchart depicting operational steps for analyzing and storing application operations, in accordance with an embodiment of the present invention.

In instances where composite application generator 110 has not previously recorded a respective user's operations performing the task, composite application generator 110 generates a composite application by detecting operations performed on a user device, determining a category associated with the detected operation, and recording the flow and associated metadata as described in greater detail with respect to FIG. 3. Thus, in response to receiving a future request from the user or other registered users for a composite application performing this recorded flow and metadata, composite application generator 110 can retrieve the stored flow, and group the microapps that satisfy the received request.

In step 206, composite application generator 110 delivers the generated composite application. In this embodiment, composite application generator 110 delivers the generated composite application to the end user by publishing the generated composite application on a server accessible by the user. Composite application generator 110 can then store the configuration of microapps, the flow associated with the received request, and metadata generated in response to executing the received requestion.

In some embodiments, composite application generator 110 can solicit feedback from the user and modify the flow. In some embodiments, composite application generator 110 can generate one or more recommendations to modify the flow. Recommendations can include changing the order in which tasks are performed and can also include recommendations for other microapps that perform similar functions that satisfy the user request.

FIG. 3 is a flowchart 300 depicting operational steps for analyzing and storing application operations, in accordance with an embodiment of the present invention.

In step 302, composite application generator 110 detects operations. In this embodiment, embodiments, composite application generator 110 can detect operations being performed as part of a task the user is executing. For example, composite application generator 110 can identify that the user is attempting to make a card and in doing so has accessed the camera application of the user device, a graphics editor to edit the photograph captured by the camera application, and respective functions of the graphic editor (e.g., text addition, graphics overlay, exposure, brilliance, highlights, shadows, contrast, brightness, black point, saturation, vibrance, warmth, tint, sharpness, definition, noise reduction, vignette, etc.) the user used in making the card. In other embodiments, composite application genitor 110 can identify operations based solely on the user request using a combination of natural language processing and machine learning techniques.

In step 304, composite application generator 110 determines a category associated with the detected operation. In this embodiment, composite application generator 110 determines a category associated with the detected operation using a combination of natural language processing and machine learning techniques. For example, in response to determining an operation as an edit to a photo, composite application generator 110 determines the respective category as a graphic editor. Other examples of categories can include, native apps, hybrid apps (e.g., CSS, JavaScript, HTML5, etc.), web apps, multimedia apps, word processors, graphics software, database software, spreadsheet presentation, enterprise, reference, content access, etc.

Composite application generator 110 can then analyze the respective categories and break down operations being performed into singular functions that can be performed by microapps. For example, composite application generator 110 can determine that the graphics editor was used to edit a photo, perform a graphics overlay, and add text. In this example, composite application generator 110 can identify that a photo editor function, a graphics editor, and word processor functions are the operations that were performed.

In step 306, composite application generator 110 records flow. In this embodiment composite application generator 110 records the flow of operations that are performed within a specified time period. For example, composite application generator 110 can detect and analyze operations performed within a five-minute period after the last operation is performed. For example, composite application generator 110 can identify that a sequence of events performed included photo edit function, graphics overlay function, a text editor and a social media application were used. However, in this instance, composite application generator 110 only records the graphics overlay function, the photo edit function, the graphics overlay function, and the text editor function because each of these functions were performed within the five-minute period. In this example, composite application generator 110 determined that the social media application was used ten minutes after the text editor function was performed and would therefore be outside of the time period. Composite application generator 110 would thus record the social media application function as the beginning of the next flow.

In this embodiment, composite application generator 110 can then combine the recorded flow by assigning the recorded flow respective tags that are related to the microapps that could perform the respective operations. For example, composite application generator 110 can parse through metadata associated with the microapps to identify respectively associated tags. Specifically, composite application generator 110 can identify that microapp A includes metadata that specifies tags such as "photo editor" and "text editor".

In other embodiments, composite application generator 110 can be configured to record flow for any period of time. In some embodiments, composite application generator 110 can be used in a manual mode, that is, be configured to start and stop recording and subsequently store flow according to the user's discretion.

In step 308, composite application generator 110 records metadata. In this embodiment, composite application generator 110 records metadata generated by the performance or execution of operations. For example, composite application generator 110 can record operations performed as metadata associated with the app (e.g., graphics overlay, text overlay, upload information, etc.) as well as metadata associated in the execution of a task (e.g., location, timestamp information, etc.).

In step 310, composite application generator 110 store recorded flow and metadata. In this embodiment, composite application generator 110 stores the recorded flow and respectively associated metadata into a database (e.g., database 112). In some embodiments, composite application generator 110 can store the recorded flow and metadata as part of a knowledge graph.

Figure 4:
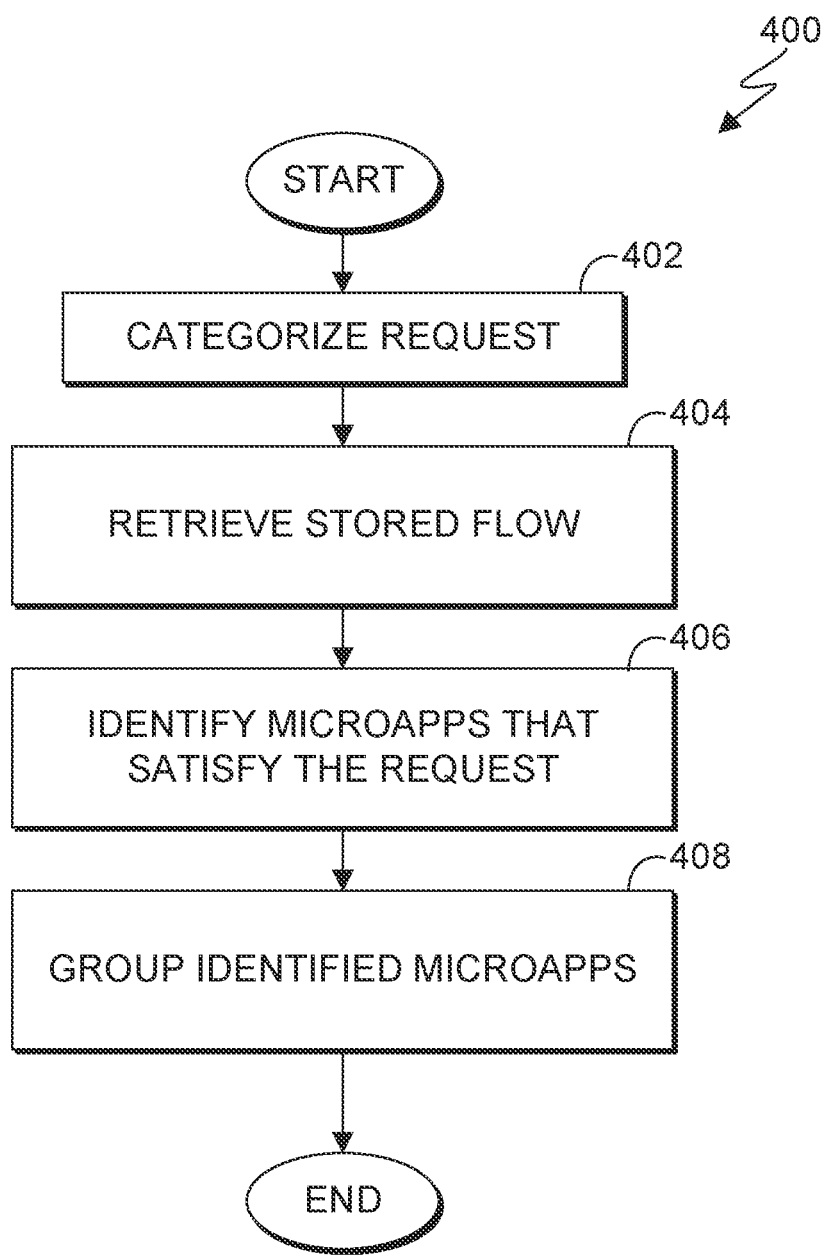
FIG. 4 is a flowchart depicting operational steps for generating a composite application, in accordance with an embodiment of the present invention

FIG. 4 is a flowchart 400 depicting operational steps for generating a composite application, in accordance with an embodiment of the present invention.

In step 402, composite application generator 110 categorizes the received request. In this embodiment, composite application generator 110 categorizes the received request using a combination of natural language processing and machine learning techniques. Examples of categories can include, operations needing to be performed (e.g., capture photo, edit photo, etc.), types of applications a user needs (e.g., a graphics editor, a photo editor, text editor, etc.), tasks that a user needs to complete (e.g., make a card, post to social media applications, etc.), etc.

In step 404, composite application generator 110 retrieves stored flow. In this embodiment, composite application generator 110 retrieves stored flow from a database (e.g., database 112). For example, composite application generator 110 can query the database for the flow based on identified categories.

In step 406, composite application generator 110 identifies microapps that satisfies the received request. In this embodiment, composite application generator 110 identifies microapps that satisfies the received request based on the request and associated operations that can fulfill the request. For example, composite application generator 110 can retrieve the identified microapps from a publicly available dataset of microapps.

In step 408, composite application generator 110 groups identified microapps. In this embodiment, composite application generator 110 groups the identified microapps as a solution and orders the identified microapps according to the flow that satisfies the received request.

Figure 5:
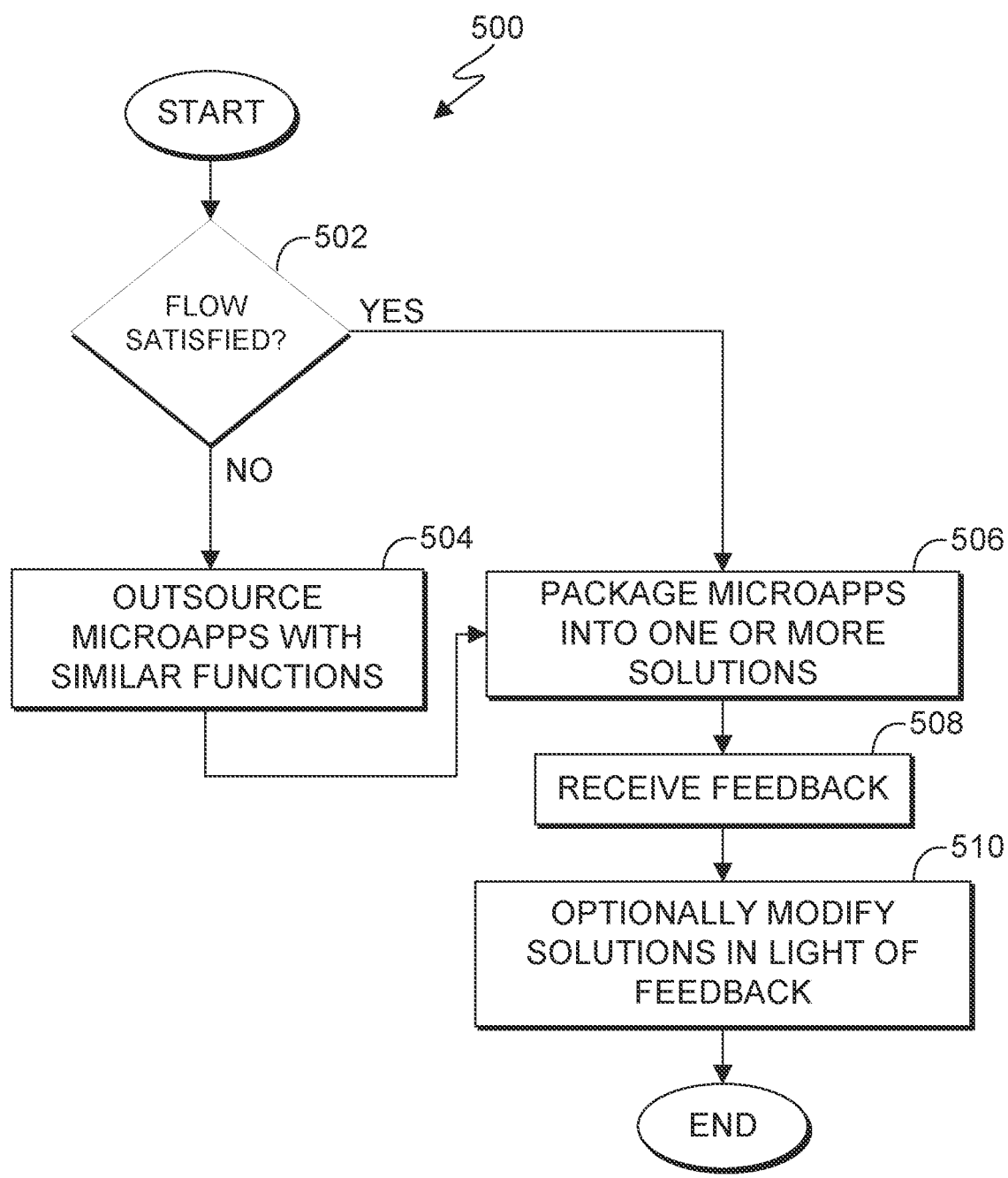
FIG. 5 is a flowchart depicting operational steps for generating recommendations of micro applications that satisfy a received request, in accordance with an embodiment of the present invention.

FIG. 5 is a flowchart 500 depicting operational steps for generating recommendations of micro applications that satisfy a received request, in accordance with an embodiment of the present invention.

In step 502, composite application generator 110 determines whether the flow is satisfied. In this embodiment, composite application generator 110 determines whether the flow is satisfied by verifying the identified microapps can fulfill the request and verifying that the order in which the microapps are arranged matches retrieved flow. For example, composite application generator 110 can reference the identified microapps and compare the identified microapps against metadata described intended functions of respectively identified microapps to confirm their purpose against tasks that the user has specified. Composite application generator 110 can then verify that the order of microapps matches the flow order that satisfies the user request.

If, in step 502, composite application generator 110 determines that the flow is not satisfied, then, in step 504, composite application generator 110 outsource microapps with similar functions. Composite application generator 110, outsources microapps with similar functions by querying other publicly available databases hosting microapps and verifying functions of other publicly available microapps that satisfy an operation required by the flow. Composite application generator 110 then proceeds to step 506.

If, in step 502, composite application generator 110 determines that the flow is satisfied, then, in step 506, composite application generator 110 packages microapps into one or more solutions. In this embodiment, composite application generator 110 can package microapps into one or more solutions that satisfy respective requests.

In step 508, composite application generator 110 receives feedback. In this embodiment, composite application generator 110 provides a mechanism to receive feedback after the solution is deployed. For example, in some instances, composite application generator 110 can transmit a survey for users to provide feedback on deployed solutions that users have used. In other embodiments, composite application generator 110 can transmit a request for feedback after a specified time period (e.g., one week after the user received or otherwise accessed the deployed solution).

In step 510, composite application generator 110 optionally modifies solutions in light of feedback. In this embodiment, composite application generator 110 optionally modifies solutions in light of feedback by selecting alternative instances of the microapp. In some instances, composite application generator 110 can identify alternate microapps having similar functions that perform operations required by the request.

Figure 6:
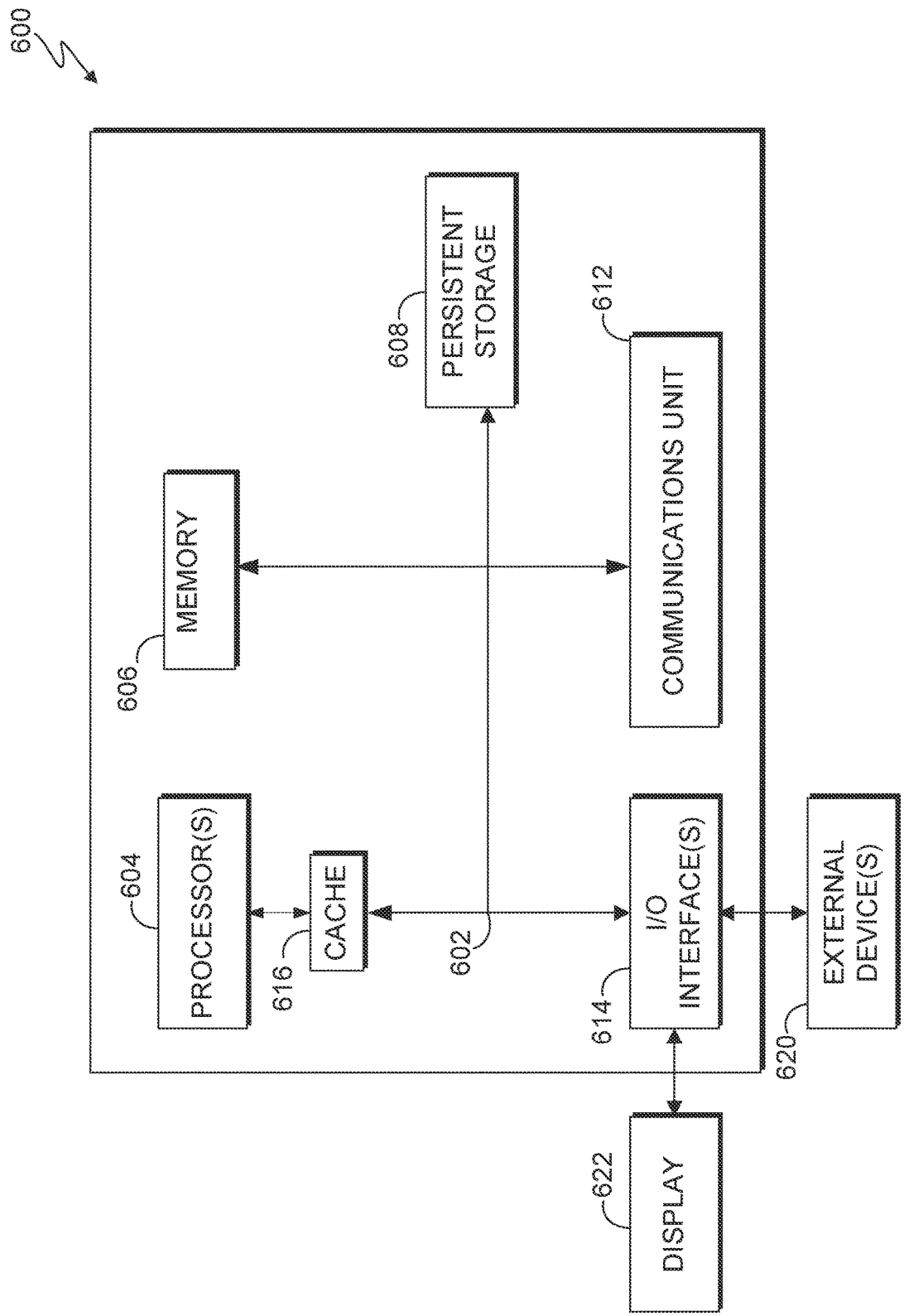
FIG. 6 is a block diagram of an example system, in accordance with an embodiment of the present invention.

FIG. 6 depicts a block diagram of components of computing systems within computing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 600 includes communications fabric 602, which provides communications between cache 616, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Composite application generator 110 (not shown) may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links. Composite application generator 110 may be downloaded to persistent storage 608 through communications unit 612.

I/O interface(s) 614 allows for input and output of data with other devices that may be connected to client computing device and/or server computer. For example, I/O interface 614 may provide a connection to external devices 620 such as a keyboard, keypad, a touch screen, and/or some other suitable input device. External devices 620 can also include portable computer readable storage media such as, for example, thumb drives, portable optical or magnetic disks, and memory cards. Software and data used to practice embodiments of the present invention, e.g., composite application generator 110, can be stored on such portable computer readable storage media and can be loaded onto persistent storage 608 via I/O interface(s) 614. I/O interface(s) 614 also connect to a display 622.

Display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    determining respective categories for a respective operation of one or more detected operations performed on a user's device;
    recording a flow of operations and metadata generated in performance of the one or more detected operations on the user's device;
    in response to receiving a request, dynamically generating a composite application that includes one or more micro applications, wherein dynamically generating a composite application comprises learning a user's intention based on detected operations performed on the user's device;
    identifying one or more microapps that satisfy the received request;
    ordering the one or more identified microapps that satisfy the received request according to the recorded flow of operations and the recorded metadata; and
    packaging the ordered microapps that satisfy the received request as the single composite application.

2. The computer-implemented method of claim 1, wherein the one or more micro applications are obtained from trusted private sources or public sources.

3. The computer-implemented method of claim 1, further comprising:
    providing a mechanism for feedback regarding the single composite application; and
    modifying the single composite application in light of feedback received.

4. The computer-implemented of claim 1, further comprising:
in response to determining that at least one microapps of a group of microapps does not satisfy the received request, outsourcing at least one microapps from another group of microapps that performs similar functions that satisfy the received request.

5. A computer program product comprising:
one or more computer readable storage media and program instructions stored on the one or more computer readable storage media, the program instructions comprising:
program instructions to determine respective categories for a respective operation of one or more detected operations performed on a user's device;
program instructions to record a flow of operations and metadata generated in performance of the one or more detected operations on the user's device;
program instructions to in response to receiving a request, dynamically generate a composite application that includes one or more micro applications, wherein dynamically generating a composite application comprises learning a user's intention based on detected operations performed on the user's device;
program instructions to identify one or more microapps that satisfy the received request;
program instructions to order the one or more identified microapps that satisfy the received request according to the recorded flow of operations; and
program instructions to package the ordered microapps that satisfy the received request as the single composite application.

6. The computer program product of claim 5, wherein the one or more micro applications are obtained from trusted private sources or public sources.

7. The computer program product of claim 5, wherein the program instructions stored on the one or more computer readable storage media further comprise:
program instructions to provide a mechanism for feedback regarding the single composite application; and
program instructions to modify the single composite application in light of feedback received.

8. The computer program product of claim 5, wherein the program instructions stored on the one or more computer readable storage media further comprise:
program instructions to, in response to determining that at least one microapps of a group of microapps does not satisfy the received request, outsource at least one microapps from another group of microapps that performs similar functions that satisfy the received request.

9. A computer system comprising:
one or more computer processors;
one or more computer readable storage media; and
program instructions stored on the one or more computer readable storage media for execution by at least one of the one or more computer processors, the program instructions comprising:
program instructions to determine respective categories for a respective operation of one or more detected operations performed on a user's device;
program instructions to record a flow of operations and metadata generated in performance of the one or more detected operations on the user's device;
program instructions to in response to receiving a request, dynamically generate a composite application that includes one or more micro applications, wherein dynamically generating a composite application comprises learning a user's intention based on detected operations performed on the user's device;
program instructions to identify one or more microapps that satisfy the received request;
program instructions to order the one or more identified microapps that satisfy the received request according to the recorded flow of operations; and
program instructions to package the ordered microapps that satisfy the received request as the single composite application.

10. The computer system of claim 9, wherein the one or more micro applications are obtained from trusted private sources or public sources.

11. The computer system of claim 9, wherein the program instructions stored on the one or more computer readable storage media further comprise:
program instructions to provide a mechanism for feedback regarding the single composite application; and
program instructions to modify the single composite application in light of feedback received.

* * * * *